(12) United States Patent
Tachinami et al.

(10) Patent No.: US 10,100,191 B2
(45) Date of Patent: Oct. 16, 2018

(54) POLYLACTIC ACID RESIN COMPOSITION

(71) Applicant: KAO CORPORATION, Tokyo (JP)

(72) Inventors: Tadashi Tachinami, Wakayama (JP);
Hiroaki Kishimoto, Sakai (JP);
Yoshiro Oda, Wakayama (JP)

(73) Assignee: KAO CORPORATION, Tokyo (JP)

( * ) Notice: Subject to any disclaimer, the term of this patent is extended or adjusted under 35 U.S.C. 154(b) by 271 days.

(21) Appl. No.: 14/902,736

(22) PCT Filed: Jul. 29, 2014

(86) PCT No.: PCT/JP2014/069880
§ 371 (c)(1),
(2) Date: Jan. 4, 2016

(87) PCT Pub. No.: WO2015/016197
PCT Pub. Date: Feb. 5, 2015

(65) Prior Publication Data
US 2016/0168375 A1    Jun. 16, 2016

(30) Foreign Application Priority Data

Jul. 31, 2013  (JP) .................................. 2013-158486

(51) Int. Cl.
| | |
|---|---|
| C08L 67/04 | (2006.01) |
| C08L 25/08 | (2006.01) |
| C08L 33/06 | (2006.01) |
| C08L 33/14 | (2006.01) |
| C08J 5/18 | (2006.01) |
| C08K 5/00 | (2006.01) |
| C08L 101/16 | (2006.01) |
| C08K 5/10 | (2006.01) |
| C08L 33/26 | (2006.01) |

(52) U.S. Cl.
CPC ................ C08L 67/04 (2013.01); C08J 5/18 (2013.01); C08K 5/0016 (2013.01); C08L 33/068 (2013.01); C08L 33/14 (2013.01); C08J 2367/04 (2013.01); C08J 2425/08 (2013.01); C08K 5/0083 (2013.01); C08K 5/10 (2013.01); C08L 33/26 (2013.01); C08L 101/16 (2013.01); C08L 2203/16 (2013.01); C08L 2205/06 (2013.01); C08L 2205/24 (2013.01)

(58) Field of Classification Search
None
See application file for complete search history.

(56) References Cited

U.S. PATENT DOCUMENTS

| | | | | |
|---|---|---|---|---|
| 7,812,066 B2 * | 10/2010 | Takenaka | ................. | C08K 5/10 523/124 |
| 8,252,852 B2 * | 8/2012 | Takenaka | ................. | C08K 5/10 523/124 |
| 9,721,555 B2 * | 8/2017 | Takenaka | ................. | C08L 67/04 |
| 2004/0138381 A1 | 7/2004 | Blasius, Jr. et al. | | |
| 2010/0063177 A1 * | 3/2010 | Takenaka | ................. | C08K 5/10 523/124 |
| 2010/0210756 A1 * | 8/2010 | Takenaka | ................. | C08K 5/10 523/124 |
| 2011/0196076 A1 | 8/2011 | Yoshino et al. | | |
| 2011/0263762 A1 * | 10/2011 | Matsuno | ................. | C08L 67/04 524/95 |
| 2012/0285721 A1 * | 11/2012 | Gallucci | ................. | C08L 83/10 174/110 N |
| 2012/0289625 A1 * | 11/2012 | Matsuno | .............. | C07D 273/08 523/451 |
| 2013/0137802 A1 | 5/2013 | Sawada et al. | | |
| 2013/0287903 A1 * | 10/2013 | Okutsu | ................... | C08L 67/04 426/106 |

FOREIGN PATENT DOCUMENTS

| | | |
|---|---|---|
| CN | 1318466 C | 5/2007 |
| CN | 101775190 A | 7/2010 |

(Continued)

OTHER PUBLICATIONS

International Search Report (Form PCT/ISA/210), dated Oct. 21, 2014, for International Application No. PCT/JP2014/069880.

(Continued)

*Primary Examiner* — Michael J Feely
(74) *Attorney, Agent, or Firm* — Birch, Stewart, Kolasch & Birch, LLP

(57) ABSTRACT

A polylactic acid resin composition containing (A) a polylactic acid resin, (B) a plasticizer, (C) an organic crystal nucleating agent, and (D) an acrylic/styrene copolymer having an epoxy group, wherein the above (B) plasticizer is an ester compound having two or more ester groups in the molecule, wherein the ester compound contains one or more members selected from the group consisting of an ester compound in which at least one kind of the alcohol component constituting the ester compound is an alcohol reacted with an alkylene oxide having from 2 to 3 carbon atoms in an amount of from 0.5 to 5 mol on average, per one hydroxyl group, and an ester compound represented by formula (I), and wherein the above (D) acrylic/styrene copolymer having an epoxy group is from 0.1 to 0.9 parts by mass, based on 100 parts by mass of (A) the polylactic acid resin. The polylactic acid resin composition of the present invention can be suitably used in various applications such as wrapping materials for food containers, daily sundries, and household electric appliances, trays for industrial parts, and the like.

18 Claims, 1 Drawing Sheet

(56) References Cited

FOREIGN PATENT DOCUMENTS

| | | | |
|---|---|---|---|
| CN | 102197067 A | 9/2011 | |
| CN | 103108914 A | 5/2013 | |
| JP | 2007-99964 A | 4/2007 | |
| JP | 2007-119730 A | 5/2007 | |
| JP | 2007-130893 A | 5/2007 | |
| JP | 2007-130894 A | 5/2007 | |
| JP | 2007-130895 A | 5/2007 | |
| JP | 2009-155489 A | 7/2009 | |
| JP | 2010-100759 A | 5/2010 | |
| JP | 2011-202079 A | 10/2011 | |
| JP | 2011-241347 A | 12/2011 | |
| JP | 2013-241504 A | 12/2013 | |
| JP | 2014-105306 A | 6/2014 | |
| WO | WO 2010/053167 A1 * | 5/2010 | .............. C08L 67/04 |
| WO | WO 2011/087155 A1 * | 7/2011 | .............. C08L 67/04 |
| WO | WO 2012/108425 A1 * | 8/2012 | .............. C08L 67/04 |

OTHER PUBLICATIONS

Chinese Office Action, issued Jun. 28, 2016, for Chinese Application No. 201480042460.9.
Japanese Office Action, dated Jan. 25, 2018, for Japanese Application No. 2014-153451.

* cited by examiner

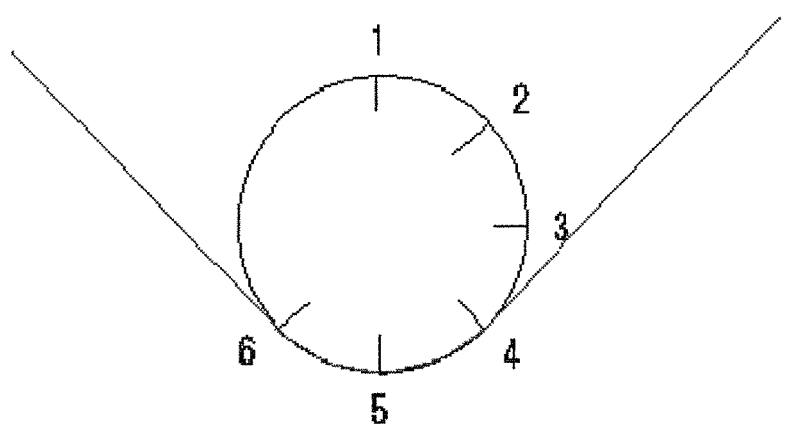

POLYLACTIC ACID RESIN COMPOSITION

FIELD OF THE INVENTION

The present invention relates to a polylactic acid resin composition. More specifically, the present invention relates to a polylactic acid resin composition which can be suitably molded to a molded article such as clear cases or trays for daily sundries, cosmetics, household electric appliances, and the like, a sheet-like molded article made of the polylactic acid resin composition, and a method for producing the sheet-like molded article.

BACKGROUND OF THE INVENTION

Polylactic acid resins have some features that polylactic acid resins are inexpensive because L-lactic acid used as a raw material is produced from sugars extracted from maize, potato or the like according to a fermentation method, that an amount of carbon dioxide discharged is very small because the raw materials are derived from plants, and that the resins have such properties as being strongly rigid and highly transparent, so that the utilization of the polylactic acid resins is expected at present.

Patent Publication 1 discloses as a polylactic acid-based resin composition having excellent crystallinity capable of molding a foamed article having excellent flame-retardant property and heat resistance, a polylactic acid-based resin composition containing a polylactic acid resin (A), a (meth) acrylic ester compound (B), and a specified flame retardant (C). In addition, the patent publication describes that the composition is blended with a crystal nucleating agent for accelerating crystallization, or blended with a foaming nucleating agent or an epoxy group-containing chain extender for the purpose of controlling sizes of foams and foaming folds when a foamed article is obtained.

Patent Publication 2 discloses as an aliphatic polyester resin composition having excellent impact resistance, a resin composition containing (A) an aliphatic polyester, (B) a multi-layered structured polymer, and (C) a reactive compound containing one or more functional groups selected from a glycidyl group, an acid anhydride group, a carbodiimide group, and an oxazoline group. Also, the patent publication discloses that the composition contains a crystal nucleating agent and a plasticizer, from the viewpoint of improving heat resistance.

In addition, Patent Publication 3 discloses as a resin composition having excellent impact resistance, a resin composition containing a polylactic acid resin, a polypropylene-based resin, a compatibilizing agent, and a crystal nucleating agent, wherein the above crystal nucleating agent is at least one member selected from the group consisting of compounds having a hydroxyl group and an amide group in the molecule, metal salts of phenylphosphonic acids, phthalocyanine, metal salts of phosphoric esters, metal salts of dialkyl esters of aromatic sulfonic acids, metal salts of rosin acids, aromatic carboxylic acid amides, rosin acid amides, carbohydrazides, N-substituted ureas, salts of melamine compounds, and uracils.

Patent Publication 1: Japanese Patent Laid-Open No. 2011-202079

Patent Publication 2: Japanese Patent Laid-Open No. 2007-119730

Patent Publication 3: Japanese Patent Laid-Open No. 2010-100759

SUMMARY OF THE INVENTION

The present invention relates to the following [1] to [3]:

[1] A polylactic acid resin composition containing (A) a polylactic acid resin, (B) a plasticizer, (C) an organic crystal nucleating agent, and (D) an acrylic/styrene copolymer having an epoxy group, wherein the above (B) plasticizer is an ester compound having two or more ester groups in the molecule, wherein the ester compound contains one or more members selected from the group consisting of an ester compound in which at least one kind of the alcohol component constituting the ester compound is an alcohol reacted with an alkylene oxide having from 2 to 3 carbon atoms in an amount of from 0.5 to 5 mol on average, per one hydroxyl group, and an ester compound represented by formula (I) set forth below, and wherein the content of the above (D) acrylic/styrene copolymer having an epoxy group is from 0.1 to 0.9 parts by mass, based on 100 parts by mass of (A) the polylactic acid resin, wherein the ester compound is represented by formula (I):

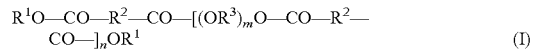

wherein $R^1$ is an alkyl group having from 1 to 4 carbon atoms, $R^2$ is an alkylene group having from 2 to 4 carbon atoms, $R^3$ is an alkylene group having 2 or 3 carbon atoms, m is the number of from 1 to 6, n is the number of from 1 to 12, with proviso that all the $R^2$'s may be identical or different, and all the $R^3$'s may be identical or different.

[2] A sheet-like molded article having a relative crystallinity of 80% or more, containing a polylactic acid resin composition as defined in the above [1].

[3] A method for producing a sheet-like molded article as defined in the above [2], including the following steps (1) and (2):

step (1): melt-kneading raw materials containing (A) a polylactic acid resin, (B) a plasticizer, (C) an organic crystal nucleating agent, and (D) an acrylic/styrene copolymer having an epoxy group to provide a polylactic acid resin composition, wherein the above (B) plasticizer is an ester compound having two or more ester groups in the molecule, wherein the ester compound contains one or more members selected from the group consisting of an ester compound in which at least one kind of the alcohol component constituting the ester compound is an alcohol reacted with an alkylene oxide having from 2 to 3 carbon atoms in an amount of from 0.5 to 5 mol on average, per one hydroxyl group, and an ester compound represented by formula (I) set forth below, and wherein the content of the above (D) acrylic/styrene copolymer having an epoxy group is from 0.1 to 0.9 parts by mass, based on 100 parts by mass of (A) the polylactic acid resin, wherein the ester compound is represented by formula (I):

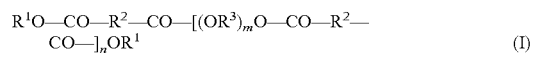

wherein $R^1$ is an alkyl group having from 1 to 4 carbon atoms, $R^2$ is an alkylene group having from 2 to 4 carbon atoms, $R^3$ is an alkylene group having 2 or 3 carbon atoms, m is the number of from 1 to 6, n is the number of from 1 to 12, with proviso that all the $R^2$'s may be identical or different, and all the $R^3$'s may be identical or different; and step (2): extrusion-molding a polylactic acid resin composition obtained in the step (1).

BRIEF DESCRIPTION OF THE DRAWINGS

FIG. 1 is a view showing the standards of a roller used when evaluating removability during sheet molding of Examples.

DETAILED DESCRIPTION OF THE INVENTION

In conventional resin compositions, resin compositions have not yet been satisfactory because granular solidified products (die drool) of resin molten mixtures are deposited in a solid state near an outlet of a T-die extruder during sheet molding, and the resin compositions are less advantageous in removability from a roller in a heat roller during sheet molding.

The present invention relates to a polylactic acid resin composition capable of suppressing the generation of die drool near an outlet of a T-die extruder during sheet molding, and having excellent removability from a heat roller, a sheet-like molded article made of the polylactic acid resin composition, a method for producing the sheet-like molded article.

The polylactic acid resin composition of the present invention exhibits some excellent effects that the generation of die drool at an outlet of T-die of a T-die extrusion molding machine during sheet molding is suppressed, and the polylactic acid resin composition has excellent removability from a heat roller, which in turn gives excellent productivity and workability.

The polylactic acid resin composition of the present invention contains (A) a polylactic acid resin, (B) a plasticizer, (C) an organic crystal nucleating agent, and (D) an acrylic/styrene copolymer having an epoxy group, characterized in that the above (B) plasticizer is an ester compound having two or more ester groups in the molecule, wherein the ester compound contains one or more members selected from the group consisting of an ester compound in which at least one member of the alcohol component constituting the ester compound is an alcohol reacted with an alkylene oxide having 2 to 3 carbon atoms in an amount of from 0.5 to 5 mol on average per one hydroxyl group, and an ester compound represented by formula (I) given later, and that the content of the above (D) acrylic/styrene copolymer having an epoxy group is from 0.1 to 0.9 parts by mass, based on 100 parts by mass of (A) the polylactic acid resin.

Each of the components will be described hereinbelow.

[Polylactic Acid Resin Composition]

[(A) Polylactic Acid Resin]

The polylactic acid resin includes commercially available polylactic acid resins, for example, LACEA H-100, H-280, H-400, H-440, etc. manufactured by Mitsui Chemicals, Inc., Nature Works PLA/NW3001D and NW4032D manufactured by Nature Works LLC, and Ecoplastic U'z S-09, S-12, S-17, etc. manufactured by TOYOTA MOTOR CORPORATION; and polylactic acid resins synthesized from lactic acid and lactides. A polylactic acid resin having an optical purity of 90% or more is preferred, from the viewpoint of improving strength and heat resistance, and, for example, a polylactic acid resin such as NW4032D, manufactured by Nature Works LLC having a relative large molecular weight and a high optical purity is preferred.

In addition, in the present invention, as the polylactic acid resin, a stereocomplex polylactic acid, composed of two kinds of polylactic acids, each obtained from a lactic acid component containing an isomer different from one another as a main component, may be used, from the viewpoint of satisfying both strength and flexibility of the polylactic acid resin composition, and improving heat resistance and transparency of the sheet.

In addition, the polylactic acid resin in the present invention may be contained as a polymer alloy formed by a blend of the polylactic acid resin with biodegradable polyester resins other than the polylactic acid resins, or with non-biodegradable resins such as polypropylene.

The content of the polylactic acid resin is preferably 50% by mass or more, more preferably 60% by mass or more, and even more preferably 70% by mass or more, of the polylactic acid resin composition, from the viewpoint of biodegradability.

[(B) Plasticizer]

The plasticizer usable in the present invention is an ester compound having two or more ester groups, preferably two to five ester groups, and more preferably from 2 to 3 ester groups, in the molecule, wherein the ester compound contains an ester compound in which at least one kind of the alcohol component constituting the ester compound is an alcohol reacted with an alkylene oxide having from 2 to 3 carbon atoms in an amount of from 0.5 to 5 mol on average, and preferably from 1 to 3 mol, per one hydroxyl group, and preferably a polyhydric alcohol ester or a polycarboxylic acid ester having two or more ester groups, preferably two to five ester groups, and more preferably from two to three ester groups in the molecule, wherein the ester compound contains an ester compound in which at least one kind of the alcohol component constituting the ester compound is an alcohol reacted with an alkylene oxide having from 2 to 3 carbon atoms in an amount of from 0.5 to 5 mol on average, and preferably from 1 to 3 mol, per one hydroxyl group, from the viewpoint of suppressing the generation of die drool and plate out, from the viewpoint of improving removability, and from the viewpoint of improving transparency and crystallinity of the sheet.

Specific examples include plasticizers listed in Japanese Patent Laid-Open Nos. 2008-174718 and 2008-115372. Among them, esters formed between acetic acid and an adduct of glycerol reacted with ethylene oxide in an amount of from 3 to 6 mol on average (reacted with 1 to 2 mol of ethylene oxide per one hydroxyl group);

esters formed between acetic acid and a polyethylene glycol reacted with ethylene oxide in an amount of from 4 to 6 mol on average;

esters formed between succinic acid and a polyethylene glycol monomethyl ether reacted with ethylene oxide in an amount of from 2 to 3 mol on average (reacted with 2 to 3 mol of ethylene oxide per one hydroxyl group);

esters formed between adipic acid and diethylene glycol monomethyl ether; and esters formed between 1,3,6-hexanetricarboxylic acid and diethylene glycol monomethyl ether are preferably used.

In addition, in the present invention, from the viewpoint of suppressing the generation of die drool and plate out, from the viewpoint of improving removability, and from the viewpoint of improving transparency and crystallinity of the sheet, an ester compound, also referred to as an oligoester, which is represented by the following formula (I) is preferably used:

$$R^1O\text{---}CO\text{---}R^2\text{---}CO\text{---}[(OR^3)_mO\text{---}CO\text{---}R^2\text{---}CO\text{---}]_nOR^1 \quad (I)$$

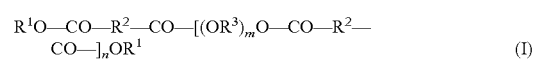

wherein $R^1$ is an alkyl group having from 1 to 4 carbon atoms, $R^2$ is an alkylene group having from 2 to 4 carbon atoms, $R^3$ is an alkylene group having from 2 or 3 carbon atoms, m is the number of from 1 to 6, and n is the number of from 1 to 12, provided that all the $R^2$'s may be identical or different, and that all the $R^3$'s may be identical or different.

$R^1$ in the formula (I) is an alkyl group having the number of carbon atoms of preferably from 1 to 4, and more preferably from 1 to 2, and two of them are present in one molecule, the two being present at both terminals of the molecule. $R^1$ may be linear or branched, so long as it has from 1 to 4 carbon atoms. Specific examples include a methyl group, an ethyl group, a propyl group, an isopropyl group, a butyl group, a sec-butyl group, and a tert-butyl group, among which a methyl group is preferred, from the viewpoint of improving compatibility with the polylactic acid resin, thereby suppressing bleed-out of the plasticizer.

$R^2$ in the formula (I) is an alkylene group having from 2 to 4 carbon atoms, which includes a linear alkylene group as a preferred example. Specific examples include an ethylene group, a 1,3-propylene group, and a 1,4-butylene group, among which an ethylene group and a 1,3-propylene group are preferred, and an ethylene group is more preferred, from the viewpoint of improving compatibility with the polylactic acid resin, thereby suppressing bleed-out of the plasticizer, or an ethylene group and a 1,4-butylene group are preferred, and an ethylene group is more preferred, from the viewpoint of suppressing bleed-out of the plasticizer, and from the viewpoint of economic advantages. Here, all the $R^2$'s may be identical or different.

$R^3$ in the formula (I) is an alkylene group having from 2 or 3 carbon atoms, and $OR^3$ is an oxyalkylene group. Specific examples include an ethylene group, a 1,2-propylene group, and a 1,3-propylene group. Here, all the $R^3$'s may be identical or different.

m is an average number of repeats of oxyalkylene groups, which is the number of from 1 to 6. When m becomes large, an ether group value of the ester compound represented by the formula (I) increases, so that the oxidation is more likely to take place, thereby lowering the stability. The number is preferably from 1 to 4, and the number is more preferably from 1 to 3, from the viewpoint of improving compatibility with the polylactic acid resin.

n is an average degree of polymerization, which is the number is from 1 to 12. The number is preferably from 1 to 4, from the viewpoint of improving compatibility with the polylactic acid resin, thereby suppressing bleed-out of the plasticizer.

Among the above structure, an oligoester formed between at least one dibasic acid selected from succinic acid, glutaric acid, and adipic acid and at least one dihydric alcohol selected from diethylene glycol, triethylene glycol, 1,2-propanediol, and 1,3-propanediol, i.e. in the formula (I), n=1.2 to 3, is preferred, from the viewpoint of improving volatile resistance.

As the compound represented by the formula (I), a commercially available product, or a compound synthesized in accordance with a known production method may be used. The compound can be produced, for example, in accordance with a method as disclosed in Japanese Patent Laid-Open No. 2012-62467.

The content of the plasticizer is preferably 5 parts by mass or more, more preferably 6 parts by mass or more, and even more preferably 8 parts by mass or more, based on 100 parts by mass of the polylactic acid resin, from the viewpoint of improving removability and crystallinity of the sheet, and the content is preferably 15 parts by mass or less, more preferably 12 parts by mass or less, and even more preferably 10 parts by mass or less, from the viewpoint of suppressing the generation of die drool and improving transparency of the sheet. In addition, the content is preferably from 5 to 15 parts by mass, more preferably from 6 to 12 parts by mass, and even more preferably from 8 to 10 parts by mass, from the viewpoint of improving removability and suppressing the generation of die drool, and from the viewpoint of improving transparency and crystallinity of the sheet.

[(C) Organic Crystal Nucleating Agent]

Also, in the present invention, an organic crystal nucleating agent is blended, and the mixture is melt-blended, from the viewpoint of suppressing the generation of die drool and plate out of the polylactic acid resin, from the viewpoint of improving removability, and from the viewpoint of improving transparency and crystallinity of the sheet. As the organic crystal nucleating agent, it is preferable to use at least one organic crystal nucleating agent selected from the group consisting of the following (a) to (d):

(a) at least one organic compound selected from the group consisting of compounds including an isoindolinone backbone, compounds including a diketo-pyrrolo-pyrrole backbone, compounds including a benzimidazolone backbone, compounds including an indigo backbone, compounds including a phthalocyanine backbone, and compounds including a porphyrin backbone [referred to as organic crystal nucleating agent (a)];

(b) at least one organic compound selected from the group consisting of carbohydrazides, uracils, and N-substituted ureas [referred to as organic crystal nucleating agent (b)];

(c) at least one organic compound selected from the group consisting of metal salts of dialkyl aromatic sulfonates, metal salts of phosphoric esters, metal salts of phenylphosphonic acids, metal salts of rosin acids, aromatic carboxylic acid amides, and rosin acid amides [referred to as organic crystal nucleating agent (c)]; and (d) at least one organic compound selected from the group consisting of compounds containing a hydroxyl group and an amide group in the molecule, and hydroxyfatty acid esters [referred to as organic crystal nucleating agent (d)].

Among them, the organic crystal nucleating agent (c) and the organic crystal nucleating agent (d) are preferred, and the organic crystal nucleating agent (d) is more preferred, from the viewpoint of suppressing the generating of die drool and plate out, and from the viewpoint of improving removability and transparency of the sheet.

The organic crystal nucleating agent (c) is preferably metal salts of phenylphosphonic acid containing a phenyl group which may have a substituent and a phosphonic group ($-PO(OH)_2$), from the above-mentioned viewpoint. Specific examples of the phenylphosphonic acids include unsubstituted phenylphosphonic acid, methylphenylphosphonic acid, ethylphenylphosphonic acid, propylphenylphosphonic acid, butylphenylphosphonic acid, dimethoxycarbonylphenylphosphonic acid, diethoxycarbonylphenylphosphonic acid, and the like, and the unsubstituted phenylphosphonic acid is preferred.

The compound containing a hydroxyl group and an amide group in the molecule of the organic crystal nucleating agent (d) is preferably an aliphatic amide containing a hydroxyl group. Specific examples include hydroxyfatty acid monoamides such as 12-hydroxystearic acid monoethanolamide; hydroxyfatty acid bisamides such as methylenebis 12-hydroxystearic amide, ethylenebis 12-hydroxystearic amide, and hexamethylenebis 12-hydroxystearic amide; and the like.

The content of the organic crystal nucleating agent is 0.05 parts by mass or more, more preferably 0.1 parts by mass or more, even more preferably 0.2 parts by mass or more, and even more preferably 0.3 parts by mass or more, based on 100 parts by mass of the polylactic acid resin, from the viewpoint of improving transparency and crystallinity of the sheet, and from the viewpoint of improving removability, and the content is preferably 2.0 parts by mass or less, more preferably 1.5 parts by mass or less, even more preferably 1.0 part by mass or less, and even more preferably 0.5 parts by mass or less, from the viewpoint of improving transparency of the sheet and suppressing bleed-out of the organic crystal nucleating agent. In addition, the content is preferably from 0.05 to 2.0 parts by mass, more preferably from 0.1 to 1.5 parts by mass, even more preferably from 0.2 to 1.0 part by mass, and even more preferably from 0.3 to 0.5 parts by mass, from the viewpoint of improving transparency of sheet and crystallinity, from the viewpoint of improving removability and suppressing bleed-out of the organic crystal nucleating agent.

In addition, the content ratio of the plasticizer to the organic crystal nucleating agent, i.e. plasticizer/organic crystal nucleating agent, is preferably from 2 to 150, more preferably from 5 to 60, even more preferably from 10 to 40, and even more preferably from 20 to 30, from the viewpoint of removability and transparency.

[(D) Acrylic/Styrene Copolymer Having Epoxy Group]

In the present invention, an acrylic/styrene copolymer having an epoxy group is used, from the viewpoint of suppressing the generation of die drool, from the viewpoint of improving removability, and from the viewpoint of improving transparency of the sheet. As the compounds, specific examples include ones manufactured by BASF such as "JONCRYL ADR4370S" (acrylic/styrene-based copolymer containing glycidyl group, weight-average molecular weight: 6,700, an epoxy equivalent: 285 g/mol), "JONCRYL ADR4368CS" (acrylic/styrene-based copolymer containing glycidyl group, weight-average molecular weight: 6,700, an epoxy equivalent: 285 g/mol), "JONCRYL ADR4368F" (acrylic/styrene-based copolymer containing glycidyl group, weight-average molecular weight: 6,700, an epoxy equivalent: 285 g/mol), "JONCRYL ADR4300S" (acrylic/styrene-based copolymer containing glycidyl group, weight-average molecular weight: 5,500, an epoxy equivalent: 445 g/mol), and ones manufactured by TOAGOSEI CO., LTD. such as "ARUFON UG4035" (acrylic/styrene-based copolymer containing glycidyl group, weight-average molecular weight: 11,000, an epoxy equivalent: 556 g/mol), "ARUFON UG4040" (acrylic/styrene-based copolymer containing glycidyl group, weight-average molecular weight: 11,000, an epoxy equivalent: 480 g/mol), "ARUFON UG4070" (acrylic/styrene-based copolymer containing glycidyl group, weight-average molecular weight: 9,700, an epoxy equivalent: 714 g/mol).

The weight-average molecular weight of the acrylic/styrene copolymer having an epoxy group is preferably 4,000 or more, more preferably 5,000 or more, and even more preferably 6,000 or more, from the viewpoint of improving removability, and the weight-average molecular weight is preferably 15,000 or less, more preferably 12,000 or less, and even more preferably 8,000 or less, from the viewpoint of suppressing the generation of die drool. In addition, the weight-average molecular weight is preferably from 4,000 to 15,000, more preferably from 5,000 to 12,000, and even more preferably from 6,000 to 8,000, from the viewpoint of suppressing the generation of die drool and improving removability. Here, the weight-average molecular weight of the acrylic/styrene copolymer having an epoxy group as used herein can be measured in accordance with a known measurement method, for example, GPC method.

The epoxy equivalence of the acrylic/styrene copolymer having an epoxy group is preferably 50 g/mol or more, more preferably 100 g/mol or more, and even more preferably 200 g/mol or more, from the viewpoint of suppressing the generation of die drool, and the epoxy equivalence is preferably 1,000 g/mol or less, more preferably 800 g/mol or less, and even more preferably 600 g/mol or less, from the viewpoint of improving removability and improving transparency of the sheet. The epoxy equivalence is preferably from 50 to 1,000 g/mol, more preferably from 100 to 800 g/mol, and even more preferably from 200 to 600 g/mol, from the viewpoint of suppressing the generation of die drool, improving removability and improving transparency of the sheet. Here, the epoxy equivalence of the acrylic/styrene copolymer having an epoxy group as used herein can be measured in accordance with a known measurement method, for example, a potentiometric titration method.

The content of the copolymer, based on 100 parts by mass of the polylactic acid resin, is 0.1 parts by mass or more, preferably 0.15 parts by mass or more, and more preferably 0.2 parts by mass or more, and the content is 0.9 parts by mass or less, preferably 0.7 parts by mass or less, and more preferably 0.6 parts by mass or less, from the viewpoint of suppressing the generation of die drool, improving removability, and improving transparency of sheet. In addition, the content is from 0.1 to 0.9 parts by mass, preferably from 0.15 to 0.7 parts by mass, and more preferably from 0.2 to 0.6 parts by mass.

In addition, the content ratio of the polylactic acid resin to the copolymer, i.e. polylactic acid resin/copolymer, is preferably 80 or more, more preferably 100 or more, even more preferably 110 or more, even more preferably 140 or more, even more preferably 150 or more, even more preferably 165 or more, and even more preferably 180 or more, and preferably 1,500 or less, more preferably 1,000 or less, even more preferably 670 or less, even more preferably 500 or less, even more preferably 400 or less, even more preferably 300 or less, and even more preferably 250 or less, from the viewpoint of suppressing the generation of die drool, improving removability, and improving transparency of the sheet. In addition, the content ratio is preferably from 80 to 1,500, more preferably from 100 to 1,000, even more preferably from 110 to 1,000, even more preferably from 140 to 670, even more preferably from 165 to 500, even more preferably from 165 to 400, and even more preferably from 180 to 250.

It is preferable that the polylactic acid resin composition of the present invention further contains a hydrolysis inhibitor, in addition to the components (A) to (D) mentioned above.

[(E) Hydrolysis Inhibitor]

In the polylactic acid resin composition of the present invention, it is preferable to use an aliphatic carbodiimide compound as a hydrolysis inhibitor, from the viewpoint of moldability.

Specific examples include aliphatic monocarbodiimide compounds such as di-isopropyl carbodiimide, di-octadecyl carbodiimide; and aliphatic polycarbodiimide compounds. These hydrolysis inhibitors can be used alone or in combination of two or more kinds.

The content of the aliphatic carbodiimide compound, based on 100 parts by mass of the polylactic acid resin, is preferably 0.05 parts by mass or more, more preferably 0.1 parts by mass or more, and even more preferably 0.2 parts by mass or more, from the viewpoint of suppressing hydrolysis, and the content is preferably 5 parts by mass or less, more preferably 3 parts by mass or less, and even more preferably 2 parts by mass or less, from the viewpoint of improving removability. In addition, the content is preferably from 0.05 to 5 parts by mass, more preferably from 0.1 to 3 parts by mass, and even more preferably from 0.2 to 2 parts by mass, from the viewpoint of hydrolysis inhibition and transparency.

The polyester resin composition of the present invention can contain, as other components besides those mentioned above, a lubricant, an inorganic crystal nucleating agent, a filler including an inorganic filler and an organic filler, a flame retardant, an antioxidant, an ultraviolet absorbent, an antistatic agent, an anti-clouding agent, a photostabilizer, a pigment, a mildewproof agent, a bactericidal agent, a blowing agent, an impact improving agent, or the like, within the range that would not impair the effects of the present invention. In addition, similarly, other polymeric materials and other resin compositions can be contained within the range that would not impair the effects of the present invention.

The polylactic acid resin composition of the present invention can be prepared without particular limitations, so long as the polylactic acid resin composition contains the components (A) to (D) mentioned above. For example, the polylactic acid resin composition can be prepared by melt-kneading raw materials containing a polylactic acid resin, a plasticizer, an organic crystal nucleating agent, and an acrylic/styrene copolymer having an epoxy group, and further optionally various additives, such as a hydrolysis inhibitor, with a known kneader, such as a closed kneader, a single-screw or twin-screw extruder, or an open roller kneader. The raw materials can also be subjected to melt-kneading after homogeneously mixing the raw materials with a Henschel mixer, a super mixer or the like in advance. The polylactic acid resin composition in which components (B) to (D) are previously melt-kneaded at a high concentration and a polylactic acid resin can be mixed and used. Here, when the polylactic acid resin composition is prepared, a supercritical gas may be allowed to be present while mixing in a molten state in order to accelerate plasticity of the polylactic acid resin. After melt-kneading, a melt-kneaded product may be dried in accordance with a known method.

The melt-kneading temperature is preferably 170° C. or higher, more preferably 175° C. or higher, and even more preferably 180° C. or higher, and preferably 270° C. or lower, more preferably 260° C. or lower, and even more preferably 250° C. or lower, from the viewpoint of suppressing the generation of die drool and plate out of the polylactic acid resin composition, and from the viewpoint of improving removability and transparency. The melt-kneading temperature is preferably from 170° to 270° C., more preferably from 175° to 260° C., and even more preferably from 180° to 250° C. The melt-kneading time cannot be unconditionally determined because the melt-kneading time depends upon a melt-kneading temperature and the kinds of a kneader, and the melt-kneading time is preferably from 15 to 900 seconds.

[Sheet-Like Molded Article]

Since the polylactic acid resin composition of the present invention thus obtained has excellent secondary processability such as thermoforming ability, a sheet-like molded article can be obtained, for example, by filling a polyester resin composition of the present invention in a heated extruder to melt, and thereafter extruding the composition from a T-die. Accordingly, the present invention also provides a sheet-like molded article made of a polylactic acid resin composition of the present invention. Here, the sheet-like molded article of the present invention is a product obtained by extruding a polylactic acid resin composition of the present invention without forming a solid product near an outlet of the T die. In addition, the extruded sheet-like molded article is immediately contacted with a cooling roller and then with a heat roller, thereby adjusting crystallinity of the sheet, and thereafter the sheet is cut, whereby a sheet-like molded article can be obtained. In this instance, since the removability from a heat roller is excellent, the sheet-like molded article obtained has suppressed wrinkle formation. Here, when the extruder is filled, the raw materials constituting the polylactic acid resin composition of the present invention, including, for example, a polylactic acid resin, a plasticizer, an organic crystal nucleating agent, and an acrylic/styrene copolymer having an epoxy group, and further optionally various additives such as a hydrolysis inhibitor, may be filled, and the mixture is melt-kneaded, and thereafter subjected to extrusion-molding.

The temperature of the extruder is preferably 170° C. or higher, more preferably 175° C. or higher, even more preferably 180° C. or higher, and preferably 240° C. or lower, more preferably 220° C. or lower, and even more preferably 210° C. or lower, from the viewpoint of suppressing the generation of die drool and plate out, from the viewpoint of improving removability, and from the viewpoint of improving transparency of sheet and crystallinity. In addition, the temperature of the extruder is preferably from 170° to 240° C., more preferably from 175° to 220° C., and even more preferably from 180° to 210° C. In the present invention, the temperature of the extruder means a cylinder temperature of a twin-screw kneading part of the extruder. The residence time in the extruder cannot be unconditionally defined because the residence time depends upon the thickness and width of the sheet and the sheet winding speed, and the residence time is preferably from 30 seconds to several minutes or so, from the viewpoint of avoiding degradation by heat.

The temperature of the cooling roller is preferably set to a temperature lower than Tg of the polylactic acid resin composition, from the viewpoint of suppressing plate out, from the viewpoint of improving removability, and from the viewpoint of improving transparency of the sheet and crystallinity, and specifically, the temperature of the cooling roller is preferably lower than 40° C., more preferably 30° C. or lower, and even more preferably 20° C. or lower.

The time contacting the cooling roller is not necessarily defined because the time differs depending upon the set temperatures of the cooling rollers, the number of cooling rollers, the extrusion rate, and the sheet wind-up speed. For example, the time contacting the cooling roller is preferably from 1 to 60 seconds, more preferably from 3 to 50 seconds, and even more preferably from 5 to 40 seconds, from the viewpoint of suppressing plate out, and from the viewpoint of improving removability and transparency.

The surface temperature of a heat roller is preferably set to a temperature equal to or higher than Tg of the polylactic acid resin composition, from the viewpoint of suppressing plate out, from the viewpoint of improving removability, and from the viewpoint of improving transparency of the sheet and crystallinity. Specifically, the surface temperature is preferably 65° C. or higher, more preferably 70° C. or higher, even more preferably 80° C. or higher, and preferably 90° C. or lower. In addition, a total of the time period contacting the heat roller is preferably 5 seconds or more, more preferably 10 seconds or more, and even more preferably 15 seconds or more. Here, the surface temperature of a heat roller means an actually measured temperature of a roller surface, which can be measured with a contact-type thermometer.

In addition, the present invention provides a method for producing a sheet-like molded article of the present invention.

The method for production may be a method that includes the step of melt-kneading a polylactic acid resin, a plasticizer, an organic crystal nucleating agent, and an acrylic/styrene copolymer having an epoxy group, and subjecting a kneaded mixture to extrusion molding. For example, the following method is preferably used.

Specifically, the method for production includes a method including the following steps (1) and (2):

step (1): melt-kneading raw materials containing (A) a polylactic acid resin, (B) a plasticizer, (C) an organic crystal nucleating agent, and (D) an acrylic/styrene copolymer having an epoxy group to provide a polylactic acid resin composition, wherein the above (B) plasticizer is an ester compound having two or more ester groups in the molecule, wherein the ester compound contains one or more members selected from the group consisting of an ester compound in which at least one kind of the alcohol component constituting the ester compound is an alcohol reacted with an alkylene oxide having from 2 to 3 carbon atoms in an amount of from 0.5 to 5 mol on average, per one hydroxyl group, and an ester compound represented by the formula (I), which is also referred to as an oligoester, and wherein the content of the above (D) acrylic/styrene copolymer having an epoxy group is from 0.1 to 0.9 parts by mass, based on 100 parts by mass of (A) the polylactic acid resin; and step (2): extrusion-molding a polylactic acid resin composition obtained in the step (1).

The step (1) includes melt-kneading raw materials containing (A) a polylactic acid resin, (B) a plasticizer, (C) an organic crystal nucleating agent, and (D) an acrylic/styrene copolymer having an epoxy group, and further optionally containing a hydrolysis inhibitor and other additives as needed at a temperature of preferably from 170° to 270° C., more preferably from 175° to 260° C., and even more preferably from 180° to 250° C., with a known kneader such as a closed kneader, a single-screw or twin-screw extruder, or an open-roller type kneader to provide a polylactic acid resin composition. The raw materials and the conditions of melt-kneading are in accordance with those in the section of the polylactic acid resin composition of the present invention mentioned above.

The step (2) includes subjecting a polylactic acid resin composition obtained in the step (1) to extrusion molding. As the extrusion molding, a polylactic acid resin composition can be molded with a known extrusion-molding machine. For example, in a case where an extrusion sheet molding machine manufactured by Plastics Technology Co., Ltd., 500 mm T-die, equipped with a cooling roller and a heat roller is used, a sheet-like molded article of which crystallinity is adjusted can be obtained. Here, raw materials for a polylactic acid resin composition of the present invention may be supplied to an extruder and directly melt-kneaded, or a mixture previously melt-kneaded may be filled to an extrusion molding machine.

As to the temperature of melt-kneading in an extruder, a polylactic acid resin composition mentioned above is filled and kneaded at a temperature suitable for melt-kneading mentioned above. The residence time during this melt-kneading cannot be unconditionally defined because the residence time depends upon the thickness and width of the sheet and the sheet winding speed, and the residence time is preferably from 30 seconds to several minutes or so, from the viewpoint of avoiding degradation by heat. The conditions of the extruders and the conditions when subsequently contacting a cooling roller or a heat roller are in accordance with the section of the polylactic acid resin composition of the present invention mentioned above.

Thus, a sheet-like molded article of the present invention is obtained. The sheet-like molded article of the present invention has a thickness of preferably from 100 to 1000 μm, and more preferably from 150 to 600 μm. In addition, in a case where the product after extrusion molding is contacted with a cooling roller and then with a heat roller in that order, the thickness is the same as defined above. Also, the sheet-like molded article is highly crystalline, having a relative crystallinity of preferably 80% or more, and more preferably 90% or more, and has favorable transparency and excellent heat resistance, bleeding resistance, and strength. Therefore, the molded article can be suitably used in clear cases, trays or the like for daily sundries, cosmetics, household electric appliances, and the like. Here, the relative crystallinity as used herein can be obtained by the following formula, and those having a relative crystallinity of 80% or more mean their crystallinity is high.

$$\text{Relative Crystallinity (\%)} = \{(\Delta Hm - \Delta Hcc)/\Delta Hm\} \times 100$$

A relative crystallinity is calculated as follows. Specifically, using a DSC apparatus (Diamond DSC, manufactured by PerkinElmer), the 1st RUN includes heating from 20° to 200° C. at a heating rate of 20° C./minute, keeping at 200° C. for 5 minutes, cooling from 200° to 20° C. at a cooling rate of −20° C./minute, and keeping at 20° C. for 1 minute, and further, the 2nd RUN includes heating from 20° to 200° C. at a heating rate of 20° C./minute. $\Delta Hcc$, an absolute value of a cold crystallization enthalpy of a polylactic acid resin observed in 1st RUN, and $\Delta Hm$, a melt crystallization enthalpy observed in 2nd RUN, are used in the calculation.

With respect to the embodiments mentioned above, the present invention further discloses a polylactic acid resin composition, a method for production thereof, a molded article, and applications set forth below.

<1> A polylactic acid resin composition containing (A) a polylactic acid resin, (B) a plasticizer, (C) an organic crystal nucleating agent, and (D) an acrylic/styrene copolymer having an epoxy group, wherein the above (B) plasticizer is an ester compound having two or more ester groups in the molecule, wherein the ester compound contains one or more members selected from the group consisting of the ester compound in which at least one kind of the alcohol component constituting the ester compound is an alcohol reacted with an alkylene oxide having from 2 to 3 carbon atoms in an amount of from 0.5 to 5 mol on average, per one hydroxyl group, and an ester compound represented by formula (I) set forth below, and wherein the content of the above (D) acrylic/styrene copolymer having an epoxy group is from 0.1 to 0.9 parts by mass, based on 100 parts by mass of (A) the polylactic acid resin, wherein the ester compound is represented by formula (I):

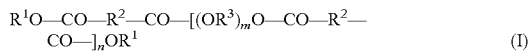

(I)

wherein $R^1$ is an alkyl group having from 1 to 4 carbon atoms, $R^2$ is an alkylene group having from 2 to 4 carbon atoms, $R^3$ is an alkylene group having 2 or 3 carbon atoms, m is the number of from 1 to 6, n is the number of from 1 to 12, with proviso that all the $R^2$'s may be identical or different, and all the $R^3$'s may be identical or different.

<2> The polylactic acid resin composition according to the above <1>, wherein the content of (A) the polylactic acid resin is preferably 50% by mass or more, more preferably 60% by mass or more, and even more preferably 70% by mass or more, of the polylactic acid resin composition.

<3> The polylactic acid resin composition according to the above <1> or <2>, wherein (B) the plasticizer is an ester compound having two or more ester groups, and preferably two to five ester groups, and more preferably from 2 to 3 ester groups, in the molecule, wherein the ester compound contains an ester compound in which at least one kind of the alcohol component constituting the ester compound is an alcohol reacted with an alkylene oxide having from 2 to 3 carbon atoms in an amount of from 0.5 to 5 mol on average, and preferably from 1 to 3 mol, per one hydroxyl group, and preferably a polyhydric alcohol ester or a polycarboxylic acid ester having two or more ester groups, preferably two to five ester groups, and more preferably two to three ester groups, wherein the ester compound contains an ester compound in which at least one kind of the alcohol component constituting the ester compound is an alcohol reacted with an alkylene oxide having from 2 to 3 carbon atoms in an amount of from 0.5 to 5 mol on average, and preferably from 1 to 3 mol, per one hydroxyl group.

<4> The polylactic acid resin composition according to any one of the above <1> to <3>, wherein the content of (B) the plasticizer, based on 100 parts by mass of (A) the polylactic acid resin, is 5 parts by mass or more, 6 parts by mass or more, and even more preferably 8 parts by mass or more, and preferably 15 parts by mass or less, more preferably 12 parts by mass or less, and even more preferably 10 parts by mass or less, and preferably from 5 to 15 parts by mass, more preferably from 6 to 12 parts by mass, and even more preferably from 8 to 10 parts by mass.

<5> The polylactic acid resin composition according to any one of the above <1> to <4>, wherein (C) the organic crystal nucleating agent is preferably an aliphatic amide containing a hydroxyl group, and more preferably hydroxyfatty acid monoamides such as 12-hydroxystearic acid monoethanolamide; and hydroxyfatty acid bisamides such as methylenebis 12-hydroxystearic amide, ethylenebis 12-hydroxystearic amide, and hexamethylenebis 12-hydroxystearic amide.

<6> The polylactic acid resin composition according to any one of the above <1> to <5>, wherein the content of (C) the organic crystal nucleating agent, based on 100 parts by mass of (A) the polylactic acid resin, is preferably 0.05 parts by mass or more, more preferably 0.1 parts by mass or more, even more preferably 0.2 parts by mass or more, and even more preferably 0.3 parts by mass or more, and preferably 2.0 parts by mass or less, more preferably 1.5 parts by mass or less, even more preferably 1.0 part by mass or less, and even more preferably 0.5 parts by mass or less, and preferably from 0.05 to 2.0 parts by mass, more preferably from 0.1 to 1.5 parts by mass, even more preferably from 0.2 to 1.0 part by mass, and even more preferably from 0.3 to 0.5 parts by mass.

<7> The polylactic acid resin composition according to any one of the above <1> to <5>, wherein a content ratio of (B) the plasticizer to (C) the organic crystal nucleating agent, plasticizer/organic crystal nucleating agent, is preferably from 2 to 150, more preferably from 5 to 60, even more preferably from 10 to 40, and even more preferably from 20 to 30.

<8> The polylactic acid resin composition according to any one of the above <1> to <7>, wherein (D) the acrylic/styrene copolymer having an epoxy group has a weight-average molecular weight of preferably 4,000 or more, more preferably 5,000 or more, and even more preferably 6,000 or more, and preferably 15,000 or less, more preferably 12,000 or less, and even more preferably 8,000 or less, and preferably from 4,000 to 15,000, more preferably from 5,000 to 12,000, and even more preferably 6,000 to 8,000.

<9> The polylactic acid resin composition according to any one of the above <1> to <8>, wherein (D) the acrylic/styrene copolymer having an epoxy group has an epoxy equivalence of preferably 50 g/mol or more, more preferably 100 g/mol or more, and even more preferably 200 g/mol or more, and preferably 1,000 g/mol or less, more preferably 800 g/mol or less, and even more preferably 600 g/mol or less, and preferably from 50 to 1,000 g/mol, more preferably from 100 to 800 g/mol, and even more preferably from 200 to 600 g/mol.

<10> The polylactic acid resin composition according to any one of the above <1> to <9>, wherein the content of (D) the acrylic/styrene copolymer having an epoxy group, based on 100 parts by mass of (A) the polylactic acid resin, is preferably 0.15 parts by mass or more, and more preferably 0.2 parts by mass or more, and preferably 0.7 parts by mass or less, and more preferably 0.6 parts by mass or less, and preferably from 0.15 to 0.7 parts by mass, and more preferably from 0.2 to 0.6 parts by mass.

<11> The polylactic acid resin composition according to any one of the above <1> to <10>, wherein the content ratio of (A) the polylactic acid resin to (D) the acrylic/styrene copolymer having an epoxy group, polylactic acid resin/copolymer, is preferably 80 or more, more preferably 100 or more, even more preferably 110 or more, even more preferably 140 or more, even more preferably 150 or more, even more preferably 165 or more, and even more preferably 180 or more, and preferably 1,500 or less, more preferably 1,000 or less, even more preferably 670 or less, even more preferably 500 or less, even more preferably 400 or less, even more preferably 300 or less, and even more preferably 250 or less.

<12> The polylactic acid resin composition according to any one of the above <1> to <11>, further containing (E) a hydrolysis inhibitor, and preferably an aliphatic carbodiimide compound.

<13> The polylactic acid resin composition according to the above <12>, wherein the content of the aliphatic carbodiimide compound, based on 100 parts by mass of the polylactic acid resin, is preferably 0.05 parts by mass or more, 0.1 parts by mass or more, and even more preferably 0.2 parts by mass or more, and preferably 5 parts by mass or less, more preferably 3 parts by mass or less, and even more preferably 2 parts by mass or less, and preferably from 0.05 to 5 parts by mass, more preferably from 0.1 to 3 parts by mass, and even more preferably from 0.2 to 2 parts by mass.

<14> The polylactic acid resin composition according to any one of the above <1> to <13>, wherein the polylactic acid composition is prepared by melt-kneading raw materials containing (A) a polylactic acid resin, (B) a plasticizer, (C) an organic crystal nucleating agent, and (D) an acrylic/ styrene copolymer having an epoxy group, further optionally various additives such as a hydrolysis inhibitor.

<15> The polylactic acid resin composition according to the above <14>, wherein the melt-kneading temperature is preferably 170° C. or higher, more preferably 175° C. or higher, and even more preferably 180° C. or higher, and preferably 270° C. or lower, more preferably 260° C. or lower, and even more preferably 250° C. or lower, and preferably from 170° to 270° C., more preferably from 175° to 260° C., and even more preferably from 180° to 250° C.

<16> A sheet-like molded article obtained by filling a polylactic acid resin composition as defined in any one of the above <1> to <15> in a heated extruder to melt, and thereafter extruding a molten mixture from a T-die.

<17> The sheet-like molded article according to the above <16>, wherein the temperature of the extruder is preferably 170° C. or higher, more preferably 175° C. or higher, and even more preferably 180° C. or higher, and preferably 240° C. or lower, more preferably 220° C. or lower, and even more preferably 210° C. or lower, and preferably from 170° to 240° C., more preferably from 175° to 220° C., and even more preferably from 180° to 210° C.

<18> A sheet-like molded article obtained by further contacting a sheet-like molded article as defined in the above <16> or <17> with a cooling roller, and then with a heat roller.

<19> The sheet-like molded article according to the above <18>, wherein the temperature of the cooling roller is preferably lower than 40° C., more preferably 30° C. or lower, and even more preferably 20° C. or lower.

<20> The sheet-like molded article according to the above <18> or <19>, wherein the time contacting the cooling roller is preferably from 1 to 60 seconds, more preferably from 3 to 50 seconds, and even more preferably from 5 to 40 seconds.

<21> The sheet-like molded article according to any one of the above <18> to <20>, wherein the surface temperature of the heat roller is preferably set to a temperature equal to or higher than Tg of the polylactic acid resin composition, and specifically the surface temperature is preferably 65° C. or higher, more preferably 70° C. or higher, and even more preferably 80° C. or higher, and preferably 90° C. or lower.

<22> The sheet-like molded article according to the above <18> or <21>, wherein the time contacting the heat roller is preferably 5 seconds or longer, more preferably 10 seconds or longer, and even more preferably 15 seconds or longer.

<23> A sheet-like molded article having a relative crystallinity of 80% or more, containing a polylactic acid resin composition as defined in any one of the above <1> to <15>.

<24> A method for producing a sheet-like molded article as defined in any one of the above <16> to <23>, including the following steps (1) and (2):
step (1): melt-kneading raw materials containing (A) a polylactic acid resin, (B) a plasticizer, (C) an organic crystal nucleating agent, and (D) an acrylic/styrene copolymer having an epoxy group to provide a polylactic acid resin composition, wherein the above (B) plasticizer is an ester compound having two or more ester groups in the molecule, wherein the ester compound contains one or more members selected from the group consisting of
an ester compound in which at least one kind of the alcohol component constituting the ester compound is an alcohol reacted with an alkylene oxide having from 2 to 3 carbon atoms in an amount of from 0.5 to 5 mol on average, per one hydroxyl group, and
an ester compound represented by formula (I) set forth below, which is also referred to as an oligoester, and
wherein the content of the above (D) acrylic/styrene copolymer having an epoxy group is from 0.1 to 0.9 parts by mass, based on 100 parts by mass of (A) the polylactic acid resin,
wherein the ester compound is represented by formula (I):

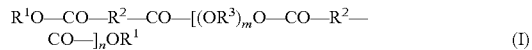

$$R^1O-CO-R^2-CO-[(OR^3)_mO-CO-R^2-CO-]_nOR^1 \quad (I)$$

wherein $R^1$ is an alkyl group having from 1 to 4 carbon atoms, $R^2$ is an alkylene group having from 2 to 4 carbon atoms, $R^3$ is an alkylene group having 2 or 3 carbon atoms, m is the number of from 1 to 6, n is the number of from 1 to 12, with proviso that all the $R^2$'s may be identical or different, and all the $R^3$'s may be identical or different; and
step (2): extrusion-molding a polylactic acid resin composition obtained in the step (1).

EXAMPLES

The present invention will be described more specifically by means of the following Examples and Comparative Examples, without intending to limit the present invention to the following Examples.

Production Example 1 of Plasticizer—$(MeEO_3)_2$
SA, Methyl Triglycol Succinate

A 3-L flask equipped with a stirrer, a thermometer, and a dehydration tube was charged with 500 g of succinic anhydride, 2,463 g of triethylene glycol monomethyl ether, and 9.5 g of paratoluenesulfonic acid monohydrate, and the contents were allowed to react at 110° C. for 15 hours under a reduced pressure of from 4 to 10.7 kPa, while blowing nitrogen at 500 mL/min in a space portion. The liquid reaction mixture had an acid value of 1.6 (mgKOH/g). To the liquid reaction mixture was added 27 g of an adsorbent KYOWAAD 500SH manufactured by Kyowa Chemical Industry Co., Ltd., and the mixture was stirred at 80° C. and 2.7 kPa for 45 minutes, and filtered. Thereafter, triethylene glycol monomethyl ether was distilled off at a liquid temperature of from 115° to 200° C. and a pressure of 0.03 kPa, and after cooling to 80° C., the residue was filtered under a reduced pressure, to provide a diester formed between succinic acid and triethylene glycol monomethyl ether, $(MeEO_3)_2SA$, as a filtrate. The diester obtained had a weight-average molecular weight of 410, a viscosity at 23° C. of 27 mPa·s, an acid value of 0.2 mgKOH/g, a saponification value of 274 mgKOH/g, a hydroxyl value of 1 mgKOH/g or less, and a hue APHA of 200. Here, this plasticizer is an ester compound in which an alcohol is reacted with 3 mol of ethylene oxide per one hydroxyl group.

Production Example 2 of
Plasticizer—MeSA-1,3PD, Oligoester Compound
Formed Between Dimethyl Succinate and
1,3-Propanediol A four-necked flask equipped with a stirrer, a thermometer, a dropping funnel, a distillation tube, and a nitrogen blowing tube was charged with 86.8 g (1.14 mol) of 1,3-propanediol and 2.2 g of a 28% by weight sodium methoxide-containing methanol solution (sodium methoxide: 0.011 mol) as a catalyst, and methanol was distilled off, while stirring the contents at 120° C. and a normal pressure for 0.5 hours. Thereafter, 500 g (3.42 mol) of dimethyl succinate manufactured by Wako Pure Chemical Industries, Ltd. was added dropwise thereto over 2 hours, and the contents were allowed to react at 120° C. and a normal pressure to distill off methanol formed by the reaction. Next, the temperature was cooled to 75° C., and the pressure was gradually dropped from a normal pressure to 6.7 kPa over 2 hours to distill off methanol, and then recovered to a normal pressure, and further 2.0 g of a 28% by weight sodium methoxide-containing methanol solution (sodium methoxide: 0.010 mol) as a catalyst was added thereto. The pressure was gradually dropped from a normal pressure to 2.9 kPa at 100° C. over 3 hours to distill off methanol. Thereafter, the temperature was cooled to 80° C., 6 g of KYOWAAD 600S manufactured by Kyowa Chemical Industry Co., Ltd. was added thereto, and the mixture was stirred at 80° C. and a pressure of 4.0 kPa for 1 hour, and then filtered under a reduced pressure. The temperature of the filtrate was raised from 114° to 194° C. at a pressure of 4.5 kPa over 1 hour to distill off the residual dimethyl succinate, to provide a yellow liquid at an ambient temperature. Here, the amount of the catalyst used was 0.61 mol per 100 mol of the dicarboxylic acid ester. Here, this plasticizer is an ester compound represented by the formula (I), wherein $R^1$ is a methyl group, $R^2$ is an ethylene group, and $R^3$ is a propylene group, m is 1, and n is 1.5.

Production Example 3 of Plasticizer—(MeEO$_4$)SA, Methyl Tetraglycol Succinate

A 3-L flask equipped with a stirrer, a thermometer, and a dehydration tube was charged with 500 g of succinic anhydride, 3,124 g of tetraethylene glycol monomethyl ether, and 9.5 g of paratoluenesulfonic acid monohydrate, and the contents were allowed to react at 130° C. for 20 hours under a reduced pressure of from 4 to 10.7 kPa, while blowing nitrogen at 500 mL/min in a space portion. The liquid reaction mixture had an acid value of 1.6 mgKOH/g. To the liquid reaction mixture was added 27 g of an adsorbent KYOWAAD 500SH manufactured by Kyowa Chemical Industry Co., Ltd., and the mixture was stirred at 80° C. and 2.7 kPa for 45 minutes, and filtered. Thereafter, tetraethylene glycol monomethyl ether was distilled off at a liquid temperature of from 150° to 250° C. and a pressure of 0.003 kPa, and after cooling to 80° C., the residue was filtered under a reduced pressure, to provide a diester formed between succinic acid and tetraethylene glycol monomethyl ether, (MeEO$_4$)$_2$SA, as a filtrate. The diester obtained had a weight-average molecular weight of 499, a viscosity at 23° C. of 35 mPa·s, an acid value of 0.2 mgKOH/g, a saponification value of 225 mgKOH/g, a hydroxyl value of 1 mgKOH/g or less, and a hue APHA of 230. Here, this plasticizer is an ester compound in which an alcohol is reacted with 4 mol of ethylene oxide per one hydroxyl group.

Production Example 4 of Plasticizer—(MeEO$_6$)$_2$SA, Methyl Hexaglycol Succinate A 3-L flask equipped with a stirrer, a thermometer, and a dehydration tube was charged with 500 g of succinic anhydride, 4,235 g of hexaethylene glycol monomethyl ether, and 9.5 g of paratoluenesulfonic acid monohydrate, and the contents were allowed to react at 150° C. for 40 hours under a reduced pressure of from 4 to 10.7 kPa, while blowing nitrogen at 500 mL/min in a space portion. The liquid reaction mixture had an acid value of 1.6 mgKOH/g. To the liquid reaction mixture was added 27 g of an adsorbent KYOWAAD 500SH manufactured by Kyowa Chemical Industry Co., Ltd., and the mixture was stirred at 80° C. and 2.7 kPa for 45 minutes, and filtered. Thereafter, hexaethylene glycol monomethyl ether was distilled off at a liquid temperature of from 200° to 280° C. and a pressure of 0.003 kPa, and after cooling to 80° C., the residue was filtered under a reduced pressure, to provide a diester formed between succinic acid and hexaethylene glycol monomethyl ether, (MeEO$_6$)$_2$SA, as a filtrate. The diester obtained had a weight-average molecular weight of 674, a viscosity at 23° C. of 42 mPa·s, an acid value of 0.2 mgKOH/g, a saponification value of 166 mgKOH/g, a hydroxyl value of 1 mgKOH/g or less, and a hue APHA of 280. Here, this plasticizer is an ester compound in which an alcohol is reacted with 6 mol of ethylene oxide per one hydroxyl group.

Examples 1 to 11 and 13 to 16 and Comparative Examples 1 to 14

Preparation of Polylactic Acid Resin Composition

As a polylactic acid resin composition, raw materials for the composition as listed in Tables 1 to 2 were melt-kneaded with a twin-screw extruder HK25D, manufactured by Perker, cylinder diameter: 25.2 mm, rotational speed 100 rpm, discharge rate: 8 kg/h at a melt-kneading temperature of from 180° to 250° C., and the kneaded mixture was strand-cut, to provide pellets of a polylactic acid resin composition. The pellets obtained were dried at 110° C. under a reduced pressure for 2 hours, so as to adjust its water content to 500 ppm or less.

Example 12

Preparation of Polylactic Acid Resin Composition

The same procedures as in Example 11 were carried out except that the content of a polylactic acid resin was changed to 34 parts by mass, to provide pellets of a polylactic acid resin composition (Nature Works 4032D/(MeEO$_3$)$_2$SA/SLI-PACKS H/Joncryl ADR4368C S/Carbodilite LA-1=34/8/0.4/0.5/0.5 (parts by mass)). The pellets obtained dried at 110° C. under a reduced pressure for 2 hours, so as to adjust its water content to 500 ppm or less. Next, 43.4 parts by mass of the pellets thus obtained and 66 parts by mass of the polylactic acid resin (Nature Works 4032D) were mixed, to provide a mixture. The mixture obtained was dried at 110° C. under a reduced pressure for 2 hours, so as to adjust its water content to 500 ppm or less.

Preparation of Sheet-Like Molded Article

The pellets or mixture obtained was subjected to molding into a sheet having a width of 40 cm with a T-die extruder manufactured by Plastics Technology Co., Ltd., 500 mm T-die, under the following conditions.

<Extrusion Molding Conditions>
Cylinder Temperature of Twin-Screw Kneaded Portion: 180° C.
T-Die (Outlet) Temperature: 180° C.
Extrusion Rate: 8 kg/h (a rate at which contact time of the cooling roller would be 34 seconds.)
Surface Temperature of Cooling Roller: 25° C.
Surface Temperature of Heat Roller: 80° C.

Here, the raw materials in Tables 1 to 2 are as follows.
<Polylactic Acid Resin>
Nature Works 4032D: Poly-L-lactic acid (optical purity: 98.5%, melting point: 160° C., weight-average molecular weight: 180,000)

<Plasticizer>
(MeEO$_3$)$_2$SA: A diester compound produced in Production Example 1 of Plasticizer mentioned above
DAIFATTY-101: An ester formed between adipic acid and benzyl alcohol and methyl diglycol, manufactured by DAIHACHI CHEMICAL INDUSTRY CO., LTD.
MeSA-1,3PD: An oligoester compound produced in Production Example 2 of Plasticizer mentioned above
ATBC: Acetyl tributyl citrate, manufactured by ASAHI KASEI FINECHEM CO., LTD.
Pluronic F68: Polyethylene glycol/polypropylene glycol copolymer, manufactured by ADEKA
(MeEO$_4$)$_2$SA: A diester compound produced in Production Example 3 of Plasticizer mentioned above
(MeEO$_6$)$_2$SA: A diester compound produced in Production Example 4 of Plasticizer mentioned above
<Crystal Nucleating Agent>
SLIPACKS H: Ethylenebis 12-hydroxystearamide, manufactured by Nippon Kasei Chemical Co., Ltd.
SLIPACKS ZHH: Hexamethylenebis 12-hydroxystearamide, manufactured by Nippon Kasei Chemical Co., Ltd.
SLIPACKS L: Ethylenebis lauramide, manufactured by Nippon Kasei Chemical Co., Ltd.
LAK-403: Barium dimethyl 5-sulfoisophthalate, manufactured by TAKEMOTO OIL & FAT Co., Ltd.
MICROACE P-6: manufactured by Nippon Talc
<Acrylic/Styrene Copolymer Containing Epoxy Group>
Joncryl ADR4368CS: Acrylic/styrene-based copolymer containing glycidyl group, Mw: 6,700, epoxy equivalence: 285 g/mol, manufactured by BASF
ARUFON UG4040: Acrylic/styrene-based copolymer containing glycidyl group, Mw: 11,000, epoxy equivalence: 480 g/mol, TOAGOSEI CO., LTD.
<Epoxy-Modified Polyethylene>
Bondfast 7M: Mw: 200,000, epoxy equivalence: 2,370 g/mol, SUMITOMO CHEMICAL CO., LTD.
<Hydrolysis Inhibitor>
Carbodilite LA-1: Polycarbodiimide, manufactured by Nisshinbo Chemical Inc.
<Impact Modifier>
PARALOID BPM-515: acrylic core-shell rubber, manufactured by Rohm & Haas Properties of the sheet-like molded article obtained and the moldability during sheet molding were evaluated in accordance with the following Test Examples 1 to 5. The results are shown in Tables 1 and 2.

Test Example 1 <Die Drool>

Die drool generated at T-die (outlet) having a width of 500 mm after 12 hours from the beginning of sheet molding was collected, and the weight thereof was measured.

Test Example 2 <Removability>

A sheet was bonded at a position 6 of FIG. 1, and a position that was removed from a heat roller (rotational speed: 1.1 rpm, roller diameter: 470 mm) was observed, and compared with the position shown in FIG. 1, thereby evaluating removability in accordance with the following evaluation criteria.
<Evaluation Criteria for Removability>
Removed Position 1: Sheet is less likely to be removed from the roller, and workability is markedly worse.
Removed Position 2: Although sheet is less likely to be removed from the roller, some workability is manageable.
Removed Position 3: Although sheet is somewhat less likely to be removed from the roller, workability is excellent.
Removed Position 4: Sheet is more likely to be removed from the roller, and some winding ups are done, so that workability is highly excellent
Removed Position 5: winding ups of sheet to the roller are worse, and workability is slightly poor.
Removed Position 6: Sheet is not rolled over the roller, and no molding can be done.

Test Example 3 <Plate Out>

It was visually confirmed that whether or not plate out took place in the heat roller after 12 hours from the beginning of sheet molding, and it was evaluated as "1" in a case generated, and as "2" in a case not generated.

Test Example 4 <Transparency>

A sample having sizes of 5 cm×5 cm×0.4 mm was prepared from a sheet after molding, and Haze value was measured using an integrating sphere-type haze transmittance measurement instrument as defined by JIS-K7105 (Model HM-150, manufactured by MURAKAMI COLOR RESEARCH LABORATORY CO., Ltd.). The smaller the number, the more excellent the transparency.

Test Example 5 <Relative Crystallinity>

As to the sheets after molding, relative crystallinity was obtained as follows. Using a DSC apparatus (Diamond DSC, manufactured by PerkinElmer), the 1st RUN included heating from 20° to 200° C. at a heating rate of 20° C./minute, keeping at 200° C. for 5 minutes, cooling from 200° to 20° C. at a cooling rate of −20° C./minute, and keeping at 20° C. for 1 minute, and further, the 2nd RUN included heating from 20° to 200° C. at a heating rate of 20° C./minute. ΔHcc, an absolute value of a cold crystallization enthalpy of a polylactic acid resin observed in 1st RUN, and ΔHm, a melt crystallization enthalpy observed in 2nd RUN, were obtained, and from the found values a relative crystallinity (%) was calculated by the following formula:

$$\text{Relative Crystallinity (\%)} = \{(\Delta Hm - \Delta Hcc)/\Delta Hm \times 100\}$$

TABLE 1

| | | Examples | | | | | | | | |
|---|---|---|---|---|---|---|---|---|---|---|
| | | 1 | 2 | 3 | 4 | 5 | 6 | 7 | 8 | 9 |
| Polylactic Acid | Nature Works 4032D | 100 | 100 | 100 | 100 | 100 | 100 | 100 | 100 | 100 |
| Plasticizer | (MeEO$_3$)$_2$SA | 10 | — | — | 10 | 10 | 10 | 10 | 10 | 10 |
| | Daifatty-101 | — | 10 | — | — | — | — | — | — | — |
| | MeSA-1,3PD | — | — | 10 | — | — | — | — | — | — |
| | (MeEO$_4$)$_2$SA | — | — | — | — | — | — | — | — | — |
| Crystal | SLIPACKS H | 0.4 | 0.4 | 0.4 | — | — | — | 0.4 | 0.4 | 0.4 |
| Nucleating | SLIPACKS ZHH | — | — | — | 0.4 | — | — | — | — | — |

TABLE 1-continued

| | | | | | | | | | | |
|---|---|---|---|---|---|---|---|---|---|---|
| Agent | SLIPACKS L | — | — | — | — | 0.4 | — | — | — | — |
| | LAK-403 | — | — | — | — | — | 0.1 | — | — | — |
| Acrylic/Styrene Copolymer Containing Epoxy Group | Joncryl ADR4368CS | 0.50 | 0.50 | 0.50 | 0.50 | 0.50 | 0.50 | — | 0.90 | 0.10 |
| | ARUFON UG4040 | — | — | — | — | — | — | 0.50 | — | — |
| Hydrolysis Inhibitor | LA-1 | — | — | — | — | — | — | — | — | — |
| Impact Modifier | BPM-515 | — | — | — | — | — | — | — | — | — |
| Plasticizer/Crystal Nucleating Agent | | 25 | 25 | 25 | 25 | 25 | 100 | 25 | 25 | 25 |
| Polylactic Acid/Copolymer | | 200 | 200 | 200 | 200 | 200 | 200 | 200 | 111 | 1000 |
| Evaluation Results | Weight (mg) of Die Drool | 0 | 0 | 0 | 0 | 23 | 31 | 18 | 45 | 35 |
| | Removability | 4 | 4 | 4 | 4 | 4 | 4 | 4 | 4 | 4 |
| | Plate out | 2 | 2 | 2 | 2 | 2 | 2 | 2 | 2 | 2 |
| | Haze (%), 0.4 mm Sheet | 4.8 | 5.9 | 5.3 | 5.2 | 5.8 | 7.5 | 5.1 | 5.7 | 4.9 |
| | Relative Crystallinity (%) | 100 | 100 | 100 | 100 | 100 | 100 | 100 | 100 | 100 |

| | | Examples | | | | | | |
|---|---|---|---|---|---|---|---|---|
| | | 10 | 11 | 12 | 13 | 14 | 15 | 16 |
| Polylactic Acid | Nature Works 4032D | 100 | 100 | 100 | 100 | 100 | 100 | 100 |
| Plasticizer | $(MeEO_3)_2SA$ | 10 | 8 | 8 | 12 | 10 | — | 12 |
| | Daifatty-101 | — | — | — | — | — | — | — |
| | MeSA-1,3PD | — | — | — | — | — | — | — |
| | $(MeEO_4)_2SA$ | — | — | — | — | — | 10 | — |
| Crystal Nucleating Agent | SLIPACKS H | 0.4 | 0.4 | 0.4 | 0.4 | 1.5 | 0.4 | 0.4 |
| | SLIPACKS ZHH | — | — | — | — | — | — | — |
| | SLIPACKS L | — | — | — | — | — | — | — |
| | LAK-403 | — | — | — | — | — | — | — |
| Acrylic/Styrene Copolymer Containing Epoxy Group | Joncryl ADR4368CS | 0.25 | 0.50 | 0.50 | 0.50 | 0.50 | 0.50 | 0.50 |
| | ARUFON UG4040 | — | — | — | — | — | — | — |
| Hydrolysis Inhibitor | LA-1 | — | 0.5 | 0.5 | — | — | — | 0.5 |
| Impact Modifier | BPM-515 | — | — | — | — | — | — | 0.5 |
| Plasticizer/Crystal Nucleating Agent | | 25 | 20 | 20 | 30 | 6.7 | 25 | 30 |
| Polylactic Acid/Copolymer | | 400 | 200 | 200 | 200 | 200 | 200 | 200 |
| Evaluation Results | Weight (mg) of Die Drool | 0 | 0 | 0 | 13 | 8 | 0 | 0 |
| | Removability | 4 | 4 | 4 | 4 | 4 | 4 | 4 |
| | Plate out | 2 | 2 | 2 | 2 | 2 | 2 | 2 |
| | Haze (%), 0.4 mm Sheet | 4.8 | 4.7 | 4.7 | 5.2 | 15.2 | 6.1 | 5.5 |
| | Relative Crystallinity (%) | 100 | 100 | 100 | 100 | 100 | 100 | 100 |

* The amounts of raw materials used are expressed by parts by mass.

TABLE 2

| | | Comparative Examples | | | | | | | |
|---|---|---|---|---|---|---|---|---|---|
| | | 1 | 2 | 3 | 4 | 5 | 6 | 7 | 8 |
| Polylactic Acid | Nature Works 4032D | 100 | 100 | 100 | 100 | 100 | 100 | 100 | 100 |
| Plasticizer | $(MeEO_3)_2SA$ | — | — | 10 | — | 10 | — | — | 10 |
| | ATBC | 10 | — | — | — | — | — | — | — |
| | Pluronic F68 | — | 10 | — | — | — | — | — | — |
| | $(MeEO_6)_2SA$ | — | — | — | — | — | — | — | — |
| Crystal Nucleating Agent | SLIPACKS H | 0.4 | 0.4 | — | — | — | 0.4 | — | 0.4 |
| | Talc | — | — | 0.4 | — | — | — | — | — |
| Acrylic/Styrene Copolymer Containing Epoxy Group | Joncryl ADR4368CS | 0.50 | 0.50 | 0.50 | — | — | — | 0.50 | — |
| | ARUFON UG4040 | — | — | — | — | — | — | — | — |
| Epoxy-Modified Polyethylene | Bondfast 7M | — | — | — | — | — | — | — | — |
| Plasticizer/Crystal Nucleating Agent | | 25 | 25 | 25 | — | 0 | — | — | 25 |
| Polylactic Acid/Copolymer | | 200 | 200 | 200 | 0 | 0 | 0 | 200 | 0 |

TABLE 2-continued

| Evaluation Results | Weight (mg) of Die Drool | 45 | 453 | 13 | 0 | 0 | 0 | 0 | 238 |
|---|---|---|---|---|---|---|---|---|---|
| | Removability | 2 | 2 | 4 | 1 | 2 | 1 | 1 | 4 |
| | Plate out | 1 | 1 | 2 | 2 | 2 | 1 | 2 | 2 |
| | Haze (%), 0.4 mm Sheet | 8.5 | 10.3 | 43 | 1.5 | 15.6 | 14.8 | 1.8 | 5.9 |
| | Relative Crystallinity (%) | 65 | 68 | 100 | 49 | 55 | 52 | 49 | 100 |

| | | Comparative Examples | | | | | |
|---|---|---|---|---|---|---|---|
| | | 9 | 10 | 11 | 12 | 13 | 14 |
| Polylactic Acid | Nature Works 4032D | 100 | 100 | 100 | 100 | 100 | 100 |
| Plasticizer | (MeEO$_3$)$_2$SA | 10 | — | 10 | 10 | — | 10 |
| | ATBC | — | — | — | — | — | — |
| | Pluronic F68 | — | — | — | — | — | — |
| | (MeEO$_6$)$_2$SA | — | — | — | — | 10 | — |
| Crystal Nucleating Agent | SLIPACKS H | — | 0.4 | 0.4 | 0.4 | 0.4 | 0.4 |
| | Talc | — | — | — | — | — | — |
| Acrylic/Styrene Copolymer Containing Epoxy Group | Joncryl ADR4368CS | 0.50 | 0.50 | 0.04 | 1.50 | 0.50 | — |
| | ARUFON UG4040 | — | — | — | — | — | — |
| Epoxy-Modified Polyethylene | Bondfast 7M | — | — | — | — | — | 10 |
| Plasticizer/Crystal Nucleating Agent | | 0 | — | 25 | 25 | 25 | 25 |
| Polylactic Acid/Copolymer | | 200 | 200 | 2500 | 66.7 | 200 | 0 |
| Evaluation Results | Weight (mg) of Die Drool | 0 | 0 | 114 | 128 | 63 | 123 |
| | Removability | 2 | 1 | 4 | 6 | 3 | 2 |
| | Plate out | 2 | 2 | 2 | 2 | 2 | 2 |
| | Haze (%), 0.4 mm Sheet | 5.7 | 2.5 | 4.9 | 6.1 | 7.5 | 35.0 |
| | Relative Crystallinity (%) | 55 | 53 | 100 | 100 | 83 | 100 |

* The amounts of raw materials used are expressed by parts by mass.

It can be seen that the polylactic acid resin compositions of Examples have suppressed generation of die drool, and have excellent removability from the roller. On the other hand, even though the polylactic acid resin compositions of Comparative Examples 4 to 7 are not found to have the generation of die drool, the removability from the roller is markedly deteriorated. Also, it can be seen that even when the organic crystal nucleating agent and the acrylic/styrene copolymer containing an epoxy group are contained, in Comparative Examples 1, 2 and 13 where the plasticizer is not one defined in the present invention, die drool is generated and removability is deteriorated.

INDUSTRIAL APPLICABILITY

The polylactic acid resin composition of the present invention can be suitably used in various applications such as wrapping materials for food containers, daily sundries, and household electric appliances, trays for industrial parts, and the like, and exhibits some excellent effects of suppressing the generation of die drool at an outlet of T-die of a T-die extrusion molding machine, and having excellent removability from a heat roller, which in turn has excellent productivity and workability.

The invention claimed is:

1. A polylactic acid resin composition comprising (A) a polylactic acid resin, (B) a plasticizer, (C) an organic crystal nucleating agent, and (D) an acrylic/styrene copolymer having an epoxy group;
wherein said (B) plasticizer is an ester compound having two or more ester groups in the molecule, wherein the ester compound comprises one or more members selected from the group consisting of:
an ester compound in which at least one kind of alcohol component constituting the ester compound is an alcohol reacted with an alkylene oxide having from 2 to 3 carbon atoms in an amount of from 0.5 to 5 mol on average, per one hydroxyl group, and
an ester compound represented by formula (I):

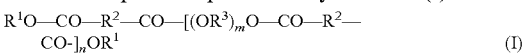

$$R^1\text{—CO—}R^2\text{—CO—}[(OR^3)_mO\text{—CO—}R^2\text{—CO-}]_nOR^1 \quad \text{(I)}$$

wherein $R^1$ is an alkyl group having from 1 to 4 carbon atoms, $R^2$ is an alkylene group having from 2 to 4 carbon atoms, $R^3$ is an alkylene group having 2 or 3 carbon atoms, m is a number of from 1 to 6, n is a number of from 1 to 12, with proviso that all the $R^2$'s may be identical or different, and all the $R^3$'s may be identical or different;
wherein the content of said (B) plasticizer is from 5 to 15 parts by mass, based on 100 parts by mass of (A) the polylactic acid resin;
wherein the content of said (C) organic crystal nucleating agent is from 0.05 to 2.0 parts by mass, based on 100 parts by mass of (A) the polylactic acid resin; and
wherein the content of said (D) acrylic/styrene copolymer having an epoxy group is from 0.1 to 0.9 parts by mass, based on 100 parts by mass of (A) the polylactic acid resin.

2. The polylactic acid resin composition according to claim 1, wherein (D) the acrylic/styrene copolymer having an epoxy group has a weight-average molecular weight of 6,000 or more and 8,000 or less.

3. The polylactic acid resin composition according to claim 2, wherein (D) the acrylic/styrene copolymer having an epoxy group has an epoxy equivalence of 200 g/mol or more and 600 g/mol or less.

4. The polylactic acid resin composition according to claim 1, wherein (D) the acrylic/styrene copolymer having an epoxy group has an epoxy equivalence of 200 g/mol or more and 600 g/mol or less.

5. The polylactic acid resin composition according to claim 1, wherein the content of (D) the acrylic/styrene copolymer having an epoxy group is from 0.15 to 0.7 parts by mass or from 0.2 to 0.6 parts by mass, based on 100 parts by mass of (A) the polylactic acid resin.

6. The polylactic acid resin composition according to claim 1, wherein the content of (B) the plasticizer is from 6 to 12 parts by mass or from 8 to 10 parts by mass, based on 100 parts by mass of (A) the polylactic acid resin.

7. The polylactic acid resin composition according to claim 1, wherein (C) the organic crystal nucleating agent comprises an aliphatic amide compound having a hydroxyl group or hydroxyl groups.

8. The polylactic acid resin composition according to claim 7, wherein the content of (C) the organic crystal nucleating agent is from 0.1 to 1.5 parts by mass or from 0.2 to 1.0 parts by mass or from 0.3 to 0.5 parts by mass, based on 100 parts by mass of (A) the polylactic acid resin.

9. The polylactic acid resin composition according to claim 1, further comprising (E) a hydrolysis inhibitor.

10. A sheet-like molded article having a relative crystallinity of 80% or more, comprising a polylactic acid resin composition as defined in claim 1.

11. A method for producing a sheet-like molded article as defined in claim 10, comprising the following steps (1) and (2):
   step (1): melt-kneading raw materials comprising (A) said polylactic acid resin, (B) said plasticizer, (C) said organic crystal nucleating agent, and (D) said acrylic/styrene copolymer having an epoxy group to provide said polylactic acid resin composition; and
   step (2): extrusion-molding said polylactic acid resin composition obtained in the step (1).

12. The method for producing a sheet-like molded article according to claim 11, wherein (D) the acrylic/styrene copolymer having an epoxy group has a weight-average molecular weight of 6,000 or more and 8,000 or less.

13. The method for producing a sheet-like molded article according to claim 12, wherein (D) the acrylic/styrene copolymer having an epoxy group has an epoxy equivalence of 200 g/mol or more and 600 g/mol or less.

14. The method for producing a sheet-like molded article according to claim 11, wherein (D) the acrylic/styrene copolymer having an epoxy group has an epoxy equivalence of 200 g/mol or more and 600 g/mol or less.

15. The method for producing a sheet-like molded article according to claim 11, wherein the content of (D) the acrylic/styrene copolymer having an epoxy group is from 0.15 to 0.7 parts by mass or from 0.2 to 0.6 parts by mass, based on 100 parts by mass of (A) the polylactic acid resin.

16. The method for producing a sheet-like molded article according to claim 11, wherein the content of (B) the plasticizer is from 6 to 12 parts by mass or from 8 to 10 parts by mass, based on 100 parts by mass of (A) the polylactic acid resin.

17. The method for producing a sheet-like molded article according to claim 11, wherein (C) the organic crystal nucleating agent comprises an aliphatic amide having a hydroxyl group.

18. The method for producing a sheet-like molded article according to claim 11, wherein the content of (C) organic crystal nucleating agent is from 0.1 to 1.5 parts by mass or from 0.2 to 1.0 parts by mass or from 0.3 to 0.5 parts by mass, based on 100 parts by mass of (A) the polylactic acid resin.

* * * * *